(12) United States Patent
Lucas

(10) Patent No.: US 9,072,289 B1
(45) Date of Patent: Jul. 7, 2015

(54) BEAR REPELLANT DEVICE MOUNTED ON A BACKPACK

(71) Applicant: William D. Lucas, Livingston, MT (US)

(72) Inventor: William D. Lucas, Livingston, MT (US)

( * ) Notice: Subject to any disclaimer, the term of this patent is extended or adjusted under 35 U.S.C. 154(b) by 37 days.

(21) Appl. No.: 13/998,185

(22) Filed: Oct. 9, 2013

Related U.S. Application Data (60) Provisional application No. 61/795,089, filed on Oct. 10, 2012.

(51) Int. Cl.
| | | |
|---|---|---|
| *B67D 7/84* | (2010.01) |
| *A01M 29/12* | (2011.01) |
| *F41H 9/10* | (2006.01) |

(52) U.S. Cl.
CPC . *A01M 29/12* (2013.01); *F41H 9/10* (2013.01)

(58) Field of Classification Search
CPC ...... F41H 9/10; G08B 15/004; B05B 7/1427; A01M 29/12
USPC .......... 222/175, 325, 385, 396, 399; 239/153, 239/152, 333, 653; 340/574
See application file for complete search history.

(56) References Cited

U.S. PATENT DOCUMENTS

| | | | |
|---|---|---|---|
| 3,523,645 A | | 8/1970 | Beauchamp |
| 5,289,164 A | * | 2/1994 | Novak ........................... 340/574 |
| 5,374,919 A | * | 12/1994 | Zelka et al. ................... 340/574 |
| 6,272,781 B1 | | 8/2001 | Resnick |
| 8,356,614 B2 | | 1/2013 | Forrester |
| 2005/0028720 A1 | | 2/2005 | Bell et al. |
| 2010/0269762 A1 | | 10/2010 | Johnson |
| 2013/0092763 A1 | | 4/2013 | Spearman |

FOREIGN PATENT DOCUMENTS

| | | |
|---|---|---|
| CA | 2279832 | 9/2001 |
| JP | 2006121977 | 5/2006 |

\* cited by examiner

*Primary Examiner* — Frederick C Nicolas
*Assistant Examiner* — Bob Zadeh
(74) *Attorney, Agent, or Firm* — Richard C. Conover (57) ABSTRACT

A bear repellant device including a pouch containing a bear spray canister mounted to a backpack. The pouch having an opening facing outwardly and rearwardly of the backpack. The bear spray canister contains bear spray and includes a nozzle for projecting bear spray outwardly in a concentrated direction and a trigger which when depressed allows the bear spray to be released through the nozzle. The canister is mounted in a holder mounted inside the pouch. The holder includes an opening aligned with the nozzle of the canister and the opening of the pouch. A trigger cam having a first and second end is rotatably mounted in the holder on an axle intermediate the ends. A cable is connected to the trigger cam for rotating the first end upwardly when pulled. The second end is positioned to depress the trigger of the canister when the first end is rotated upwardly.

6 Claims, 12 Drawing Sheets

BEAR REPELLANT DEVICE MOUNTED ON A BACKPACK

This application claims the benefit of provisional application Ser. No. 61/795,089 filed Oct. 10, 2012.

BACKGROUND OF INVENTION

The present invention relates to a bear repellant triggering device mounted to a backpack. When a person encounters a bear, the person is advised to lie down on his/her stomach and form a ball with his or her back facing upwardly. The present invention provides for a bear spray canister mounted on the back of the user in a backpack or pouch mounted to a backpack. The spray nozzle of the bear spray canister is aligned with an opening in the backpack or pouch to permit spray to project outwardly through the opening. The present invention includes a triggering device to allow the user to pull a cable or cord located on the front of the user to depress the trigger of the bear spray canister to spray a bear when a bear is located adjacent the back of a user during an attack.

A personal defense device is described in United States Patent Application Publication No. 2013/009263 to Spearman. This device includes a balloon filled with an irritant, and a canister of pressurized gas which upon actuation fills the balloon to a breaking point causing the balloon to explode dispersing the irritant contained therein in non-directional cloud.

The present invention utilizes a conventional canister of bear spray having a trigger which when depressed allows the bear spray to be released and a triggering mechanism actuated by a user to selectively depress the trigger thereby projecting the bear spray outwardly in a concentrated stream.

SUMMARY OF INVENTION

A bear repellant device according to the present invention includes a backpack having shoulder straps and a bag with attachment loops for attaching equipment to the bag. A pouch containing a bear spray canister is mounted to the attachment loops. The pouch having an opening facing outwardly and rearwardly of the backpack. The bear spray canister contains bear spray under pressure and further includes a nozzle for projecting bear spray outwardly in a concentrated direction. A trigger is provided which when depressed allows the bear spray to be released through the nozzle. The bear spray canister is mounted in a holder mounted in the interior of the pouch for holding the bear spray canister. The holder includes an opening aligned with the nozzle of the bear spray canister and the opening of the pouch. A cam member having a first and second end which is rotatably mounted in the holder has a cable connected to the first end for selectively rotating the cam member about an axle from a rest position to a position where the first end is lifted upwardly. The second end of the cam member is positioned to depress the trigger of the bear spray canister when the first end is lifted upwardly and to disengage the trigger when the first end is in the rest position.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 12:
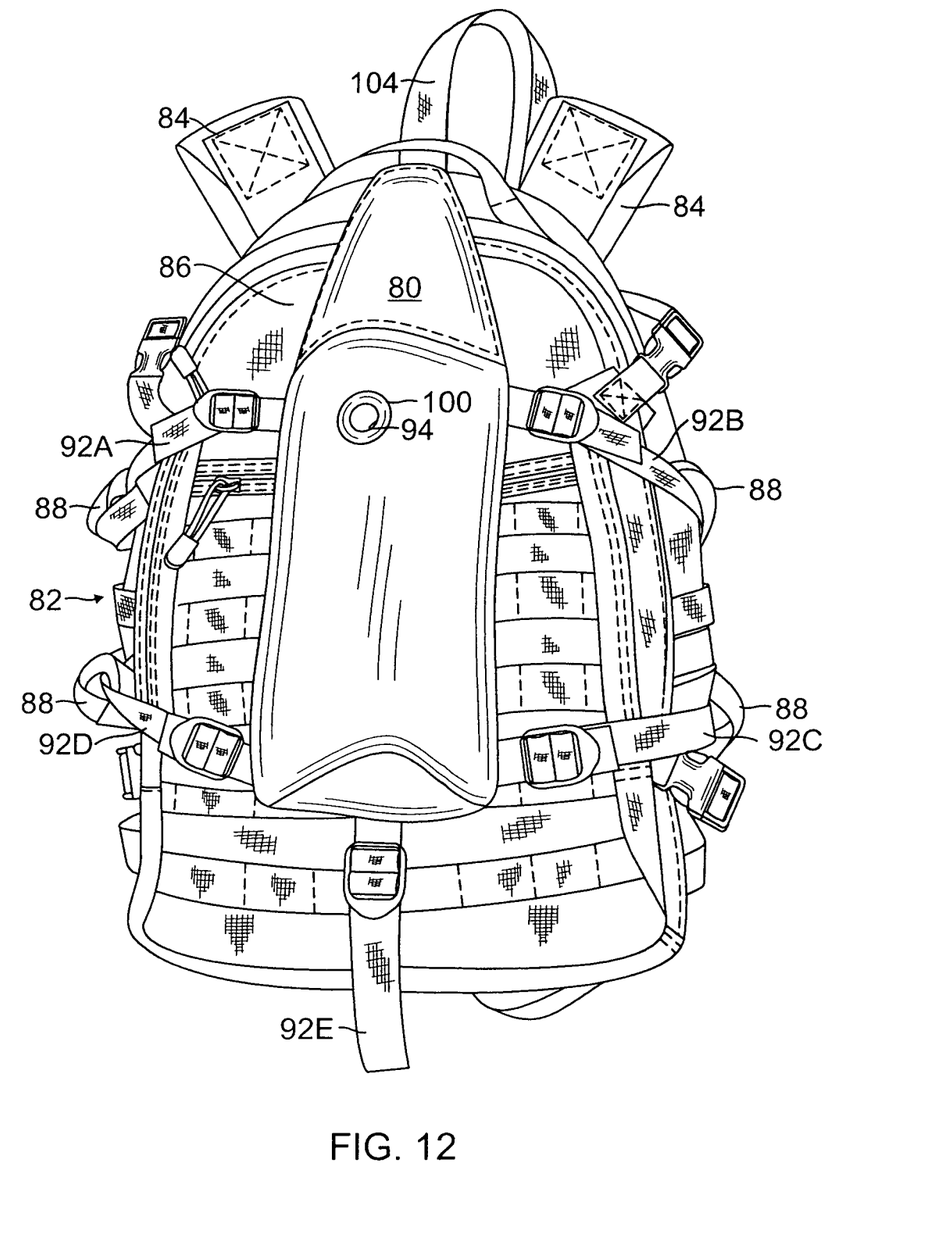
FIG. 12 is a perspective view of a preferred embodiment of the present invention utilizing a pouch secured to a backpack.

A preferred embodiment of the present invention is shown in FIG. 12 wherein a bear spray canister is mounted in a pouch 80 which in turn is secured to a conventional backpack 82. When actuated the bear spray canister projects bear spray outwardly through hole 94.

Figure 1:
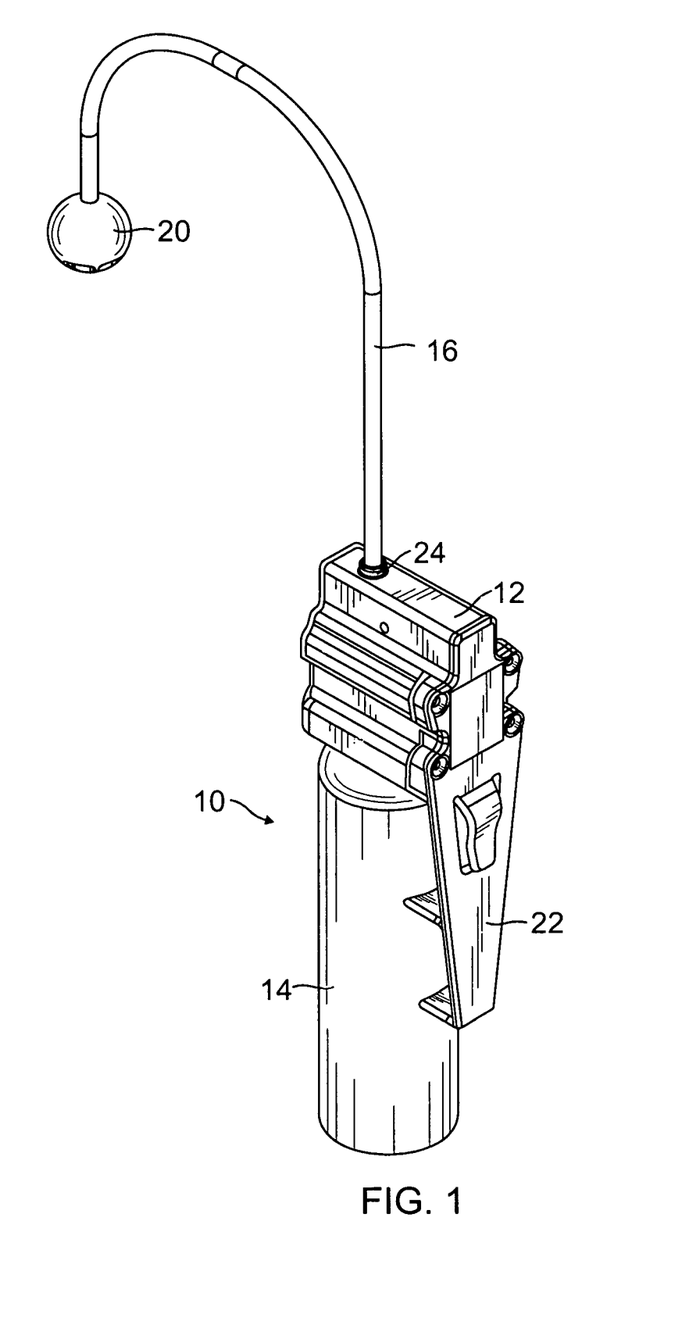
FIG. 1 is a perspective view of a bear spray canister triggering device used according to the present invention.
Figure 2:
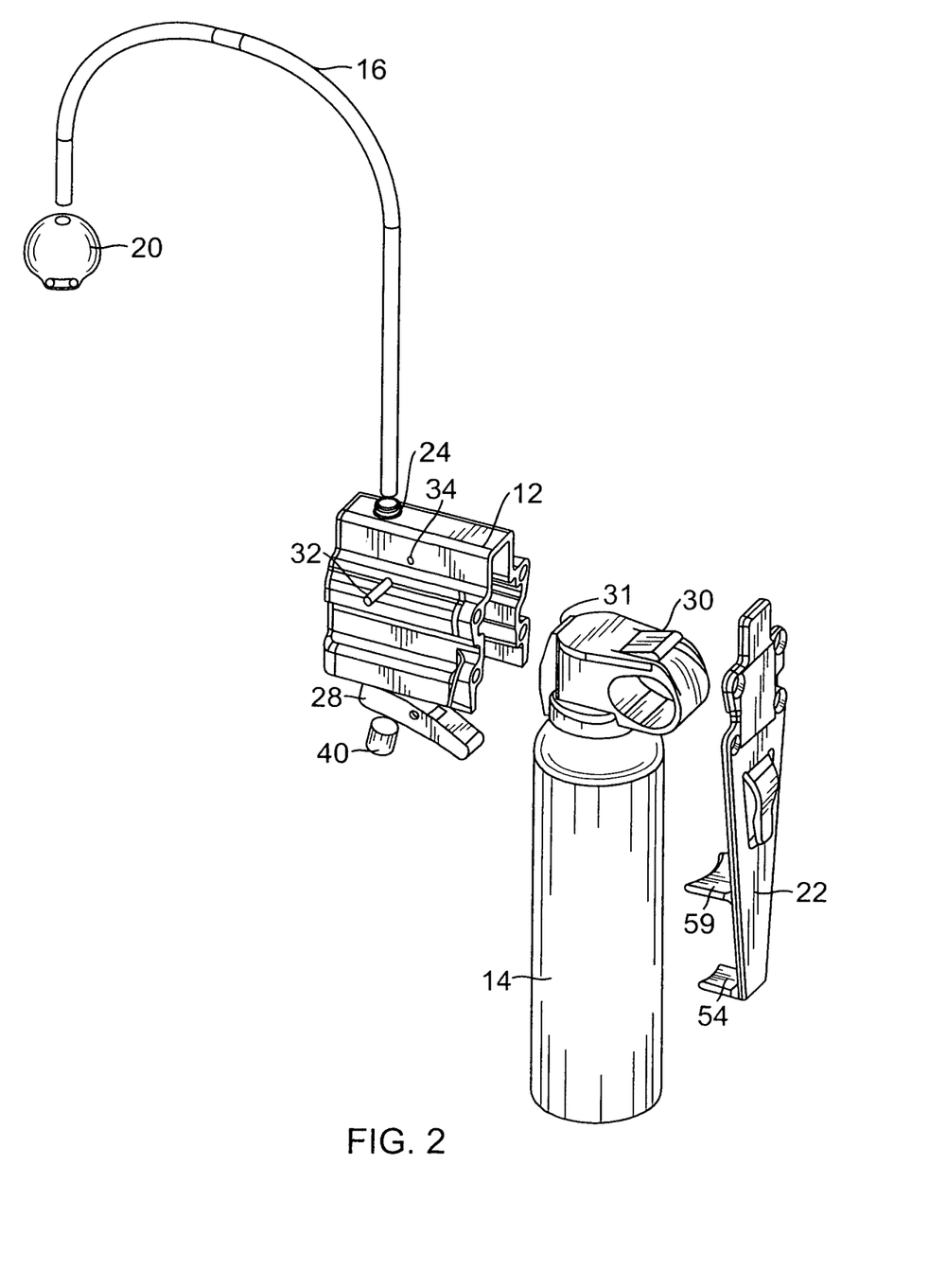
FIG. 2 is an exploded view of the device shown in FIG. 1.

A bear spray canister triggering device 10 used with the present invention is shown in FIGS. 1 and 2. The device 10 includes a holder 12 for holding a conventional bear spray canister 14 having a trigger 30 and a nozzle 31 projecting bear spray outwardly under pressure in a concentrated direction when the trigger 30 is depressed. A cable 16 is used for triggering the bear spray canister 14 in a manner described below. A pull ball 20 is attached to the cable 16 for ease of pulling cable 16 to trigger the canister 14. A bracket 22 is used to secure the canister 14 within the holder 12.

Figure 3:
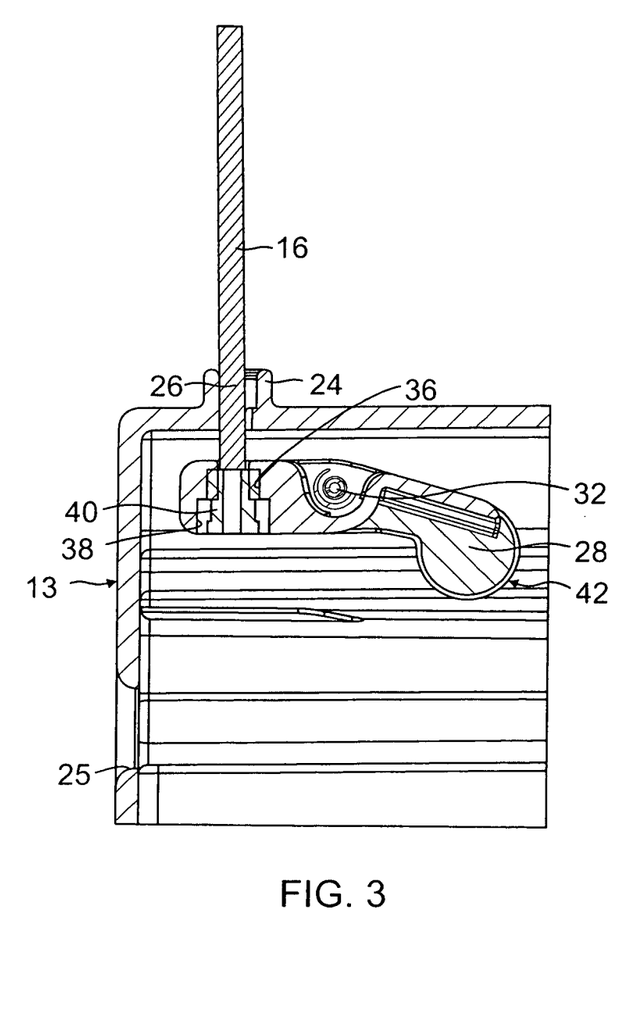
FIG. 3 is a cross-sectional view with parts broken away of the triggering device according to the present invention.
Figure 4A:
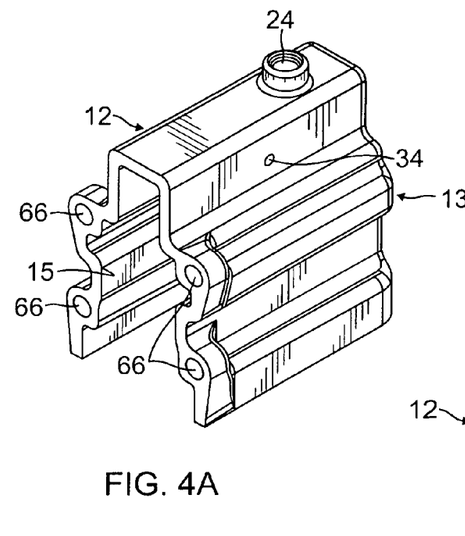
FIG. 4A is a perspective view of a holder used to hold a bear spray canister as shown in FIG. 2.
Figure 4B:
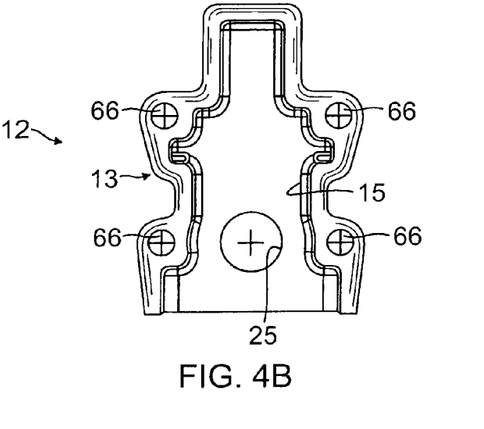
FIG. 4B is a front view of the holder shown in FIG. 4A.

The holder 12 is shown in FIGS. 4A and 4B and includes a shell 13 having an opening 15 shaped to receive the canister 14 as shown in FIG. 1. The holder 12 further includes a lug 24 having a hole 26 which extends through a top wall of the shell 13 as shown in FIG. 3 for receiving the cable 16. The holder 12 is also provided with an opening 25 located at a back wall of the shell 13 as shown in FIG. 4B. The opening 25 is aligned with the spray nozzle of the canister 14 when the canister 14 is inserted in holder 12. A trigger cam 28 is located inside the holder 12 for actuating the trigger 30 of the canister 14 as shown in FIG. 3.

Figure 5:
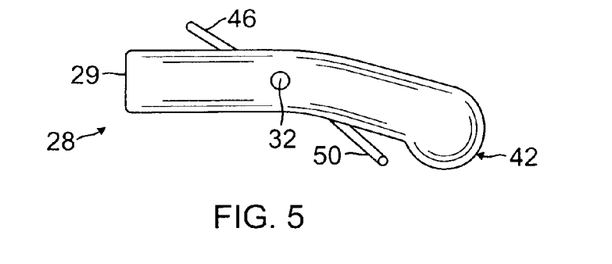
FIG. 5 is a front elevational view of a trigger cam used with the present invention.
Figure 6:
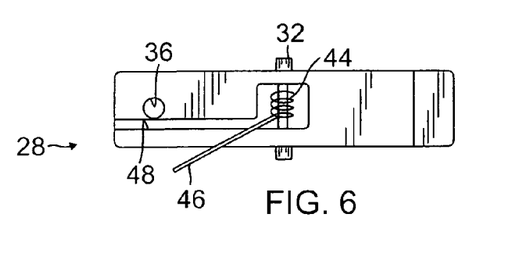
FIG. 6 is a top view of the trigger cam shown in FIG. 5.
Figure 7:
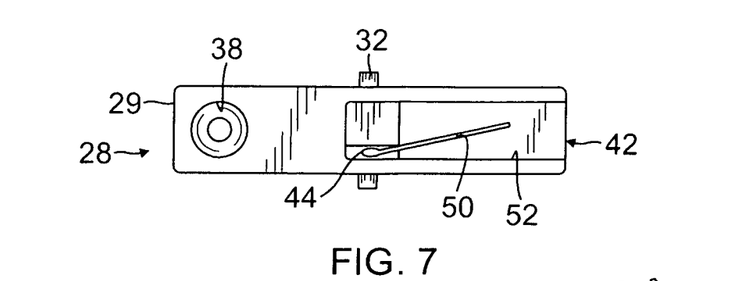
FIG. 7 is a bottom view of the trigger cam shown in FIG. 5.
Figure 8:
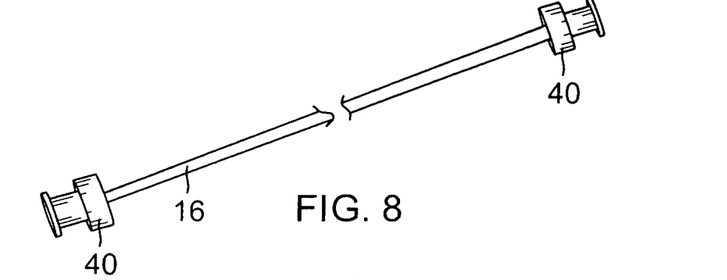
FIG. 8 is a perspective view of a cable used with the present invention.

The trigger cam 28 is shown in FIGS. 5-7. The trigger cam 28 has a first end 29 and a second end 42 and is rotatably mounted within the shell 13 on a spring pin axle 32, intermediate the ends of the trigger cam 28, which extends through openings 34 provided in the side walls of shell 13 as shown in FIG. 4A. The trigger cam 28 includes an opening 36 located adjacent the first end 29 through which the cable 16 extends. The opening 36 extends into an enlarged opening 38 as shown in FIG. 3 and an end of cable 16 is positioned in the enlarged opening 38. A cable crimp 40 is secured to the end of cable 18 located in the enlarged opening 38 and prevents the cable 16 from slipping through the opening 36. The distal end of the cable 16 is connected to the pull ball 20. In a preferred embodiment the distal end of cable 16 is provided with a cable crimp 40 as shown in FIG. 8 which is used to hold the cable 16 within the pull ball 20 in a manner similar to the end of cable 16 mounted to trigger cam 28.

In a rest position the second end 42 is disengaged from the trigger 30. Upon pulling the cable 16, the trigger cam 28 is rotated upwardly about the spring pin 32 causing the second end 42 of the trigger cam 28 to rotate downwardly to forcibly depress the trigger 30 of the canister 14 causing bear spray to be projected outwardly. A compression coil spring 44 is provided on the spring pin 32 as shown in FIG. 6. The compression spring has a leg 46 which fits in slot 48 provided in the top surface of the trigger cam 28 and when installed, rests against the upper wall of shell 13 as shown in FIG. 3. The compression spring 44 also includes a second leg 50 which rests in a slot 52 provided on the bottom surface of the trigger cam 28. When the cable 16 is pulled, the trigger cam 28 rotates in a counterclockwise direction as shown in FIG. 3 to depress the trigger 30 of the canister 14. When the cable 16 is released, the compression spring 44 resiliently returns the trigger cam 28 to a rest position disengaging the end 42 of trigger cam 28 from the trigger 30 of the canister 14.

Figure 9:
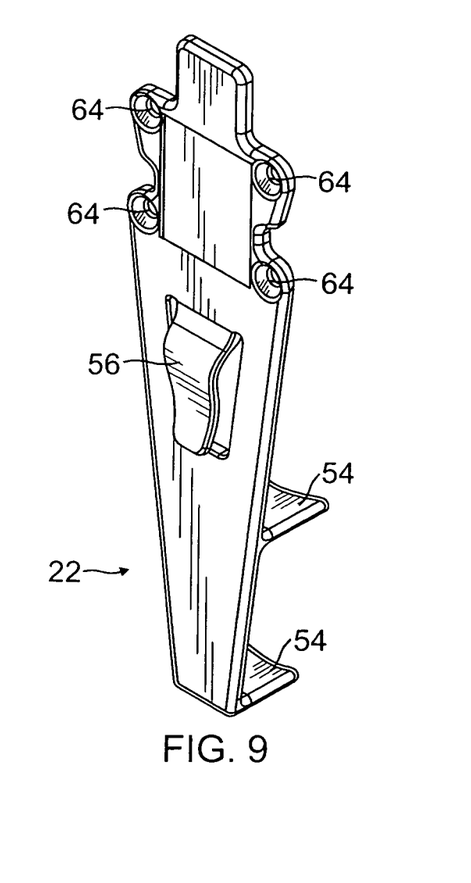
FIG. 9 is a perspective view of a bracket used to mount the bear spray canister in the holder shown in FIG. 4A.

The bracket 22 is shown in FIG. 9. The bracket 22 further includes screw holes 64 which are aligned with screw holes 66 provided in the holder 12 as shown in FIG. 4A. After canister 14 is inserted in opening 15 of the holder 12, screws (not shown) are used for attaching the bracket 22 to the holder 12 as shown in FIG. 1.

Figure 10:
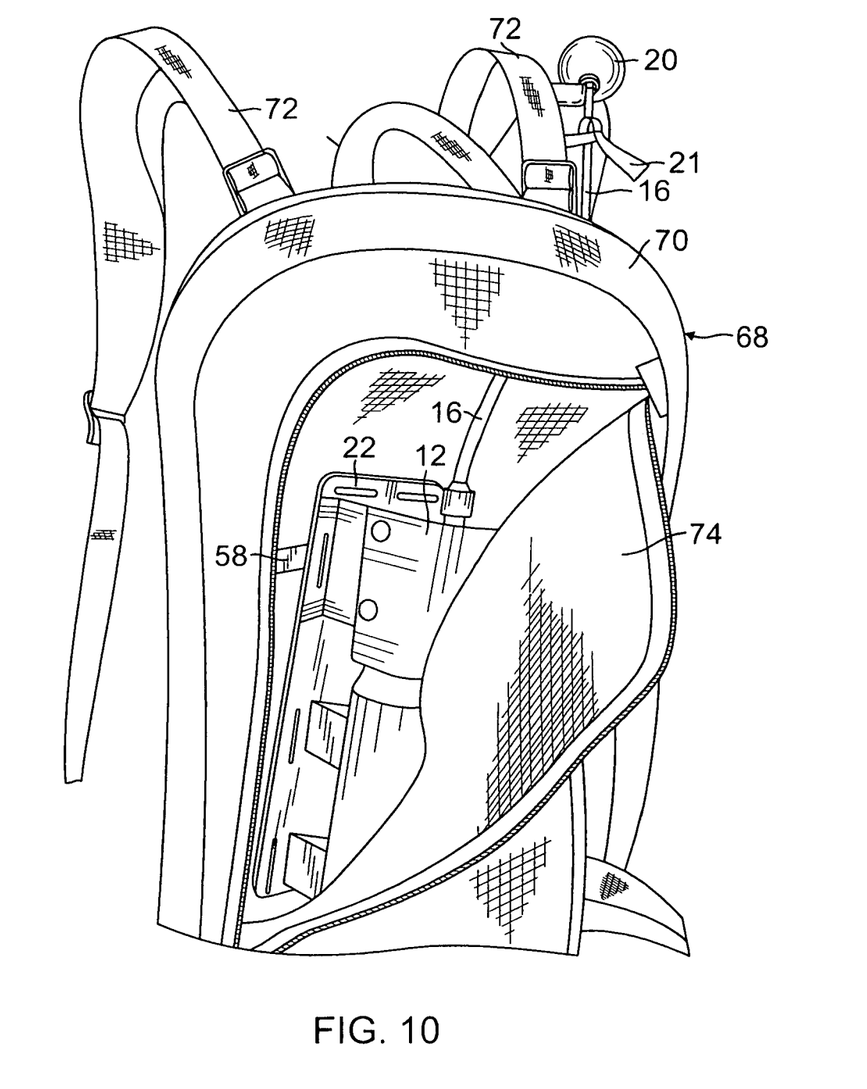
FIG. 10 is a perspective view of one embodiment of the present invention.
Figure 11:
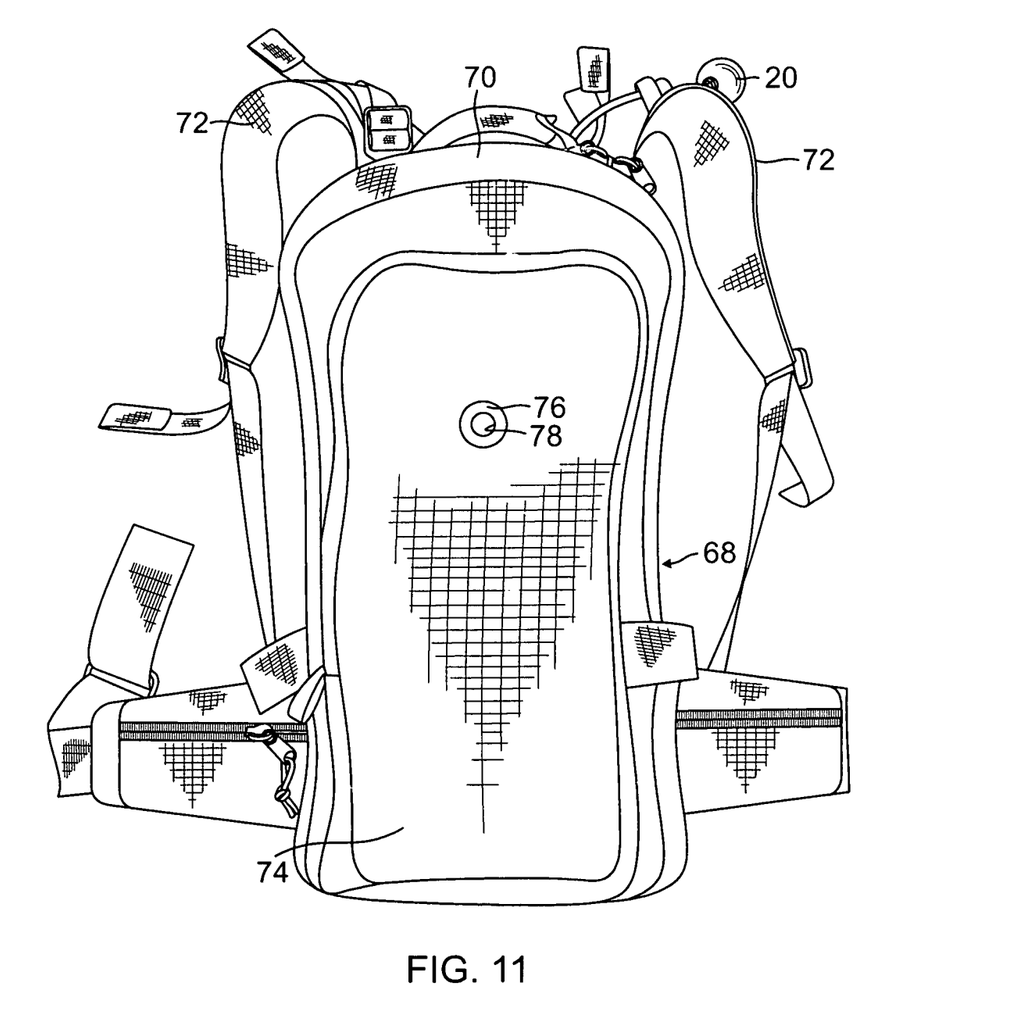
FIG. 11 is a perspective view of a backpack showing an opening through which bear spray is projected.

In a first embodiment of the present invention, the bear repellant trigger device 10 is used with a backpack 68 having a bag 70, a pair of shoulder straps 72 and a releasable flap 74 for allowing access to the interior of bag 70. The holder 12 is secured to the flap 74 with a grommet 76 extending through a hole 78 provided in the flap 74 and further through the opening 25 provided in the shell 13. When the canister 14 is inserted in the holder 12, the nozzle of the canister 14 is aligned with the opening 25. The cable 16 is threaded to the front of a person wearing the backpack and the pull ball 20 secured to a front face of a shoulder strap 72 with a strap 21 so that when a person is lying on his stomach on the ground with the backpack facing upwardly, the pull ball 20 can be pulled to actuate the canister 14. When the canister 14 is actuated, spray exits the backpack under pressure in a concentrated direction through the opening 78. The bracket 22 further includes a clip 56 for clipping on a strap 58 secured to the back panel of the bag 70.

A preferred embodiment of the present invention is shown in FIG. 12. In this embodiment, the canister 14 is enclosed in a separate pouch 80 detachably connected to a conventional backpack 82 having a pair of shoulder straps 84 and a bag 86 having exteriorly located attachment loops 88 for attaching equipment to the bag 86.

Figure 14:
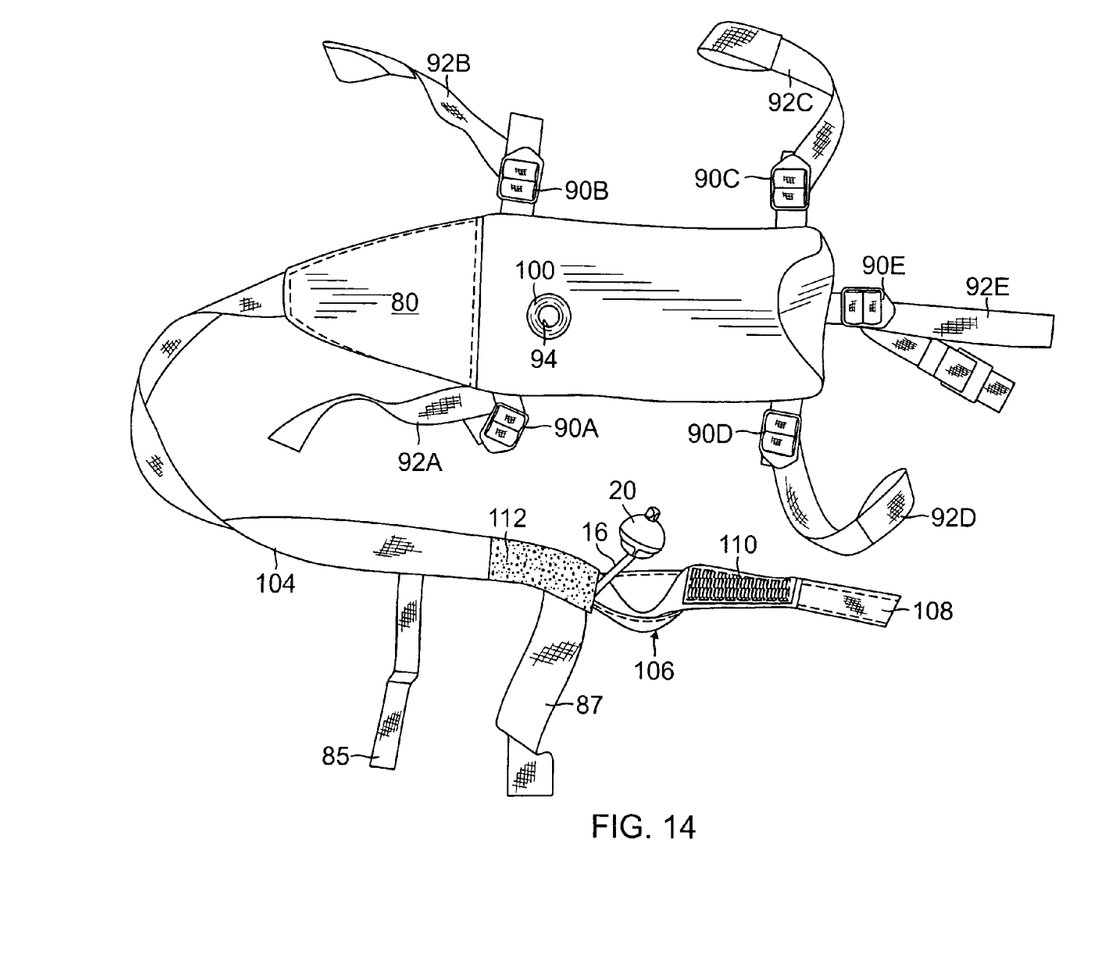
FIG. 14 is a top view of the pouch shown in FIG. 12.
Figure 15:
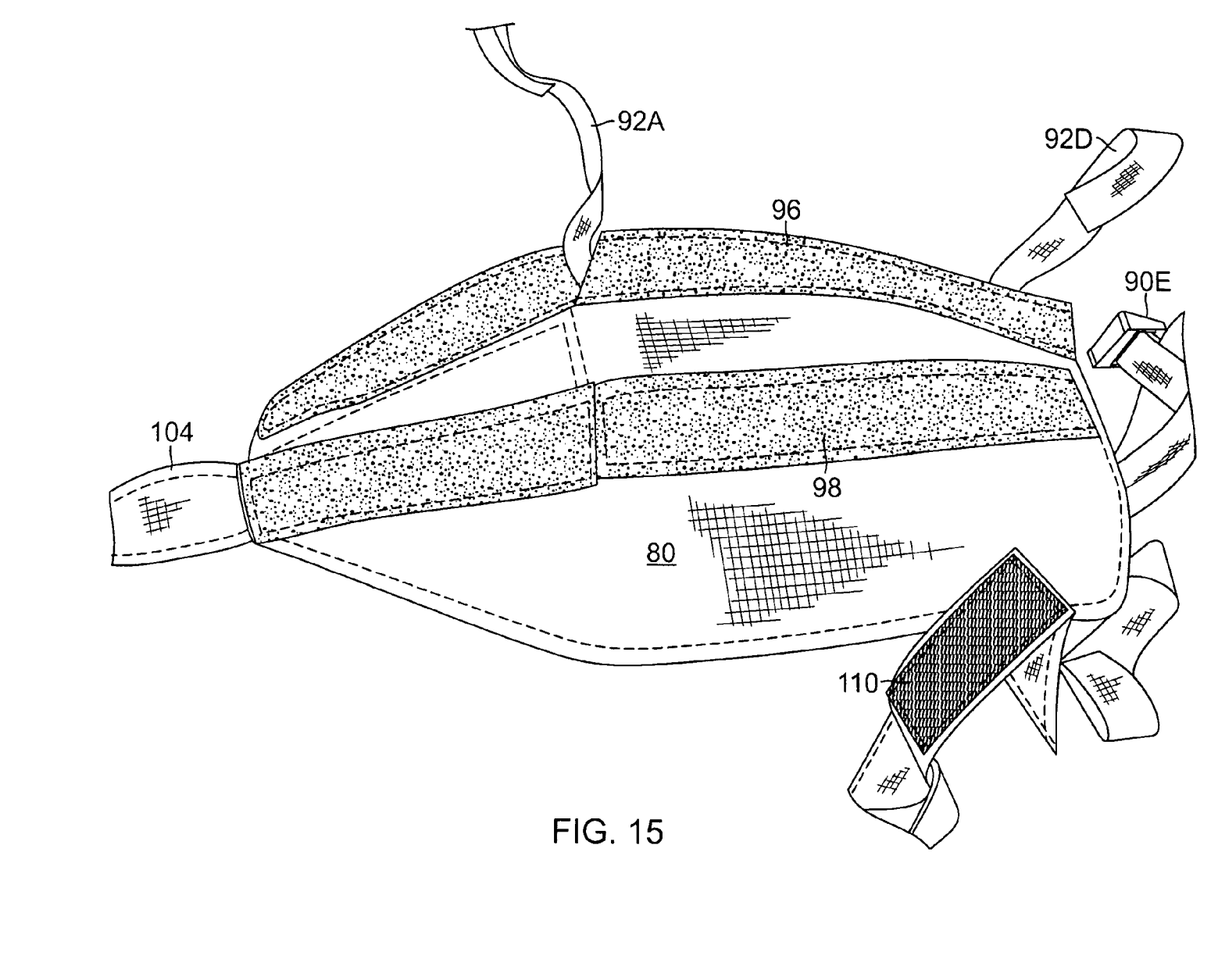
FIG. 15 is a bottom view of the pouch shown in FIG. 14 showing an opening into the interior of the pouch.
Figure 16:
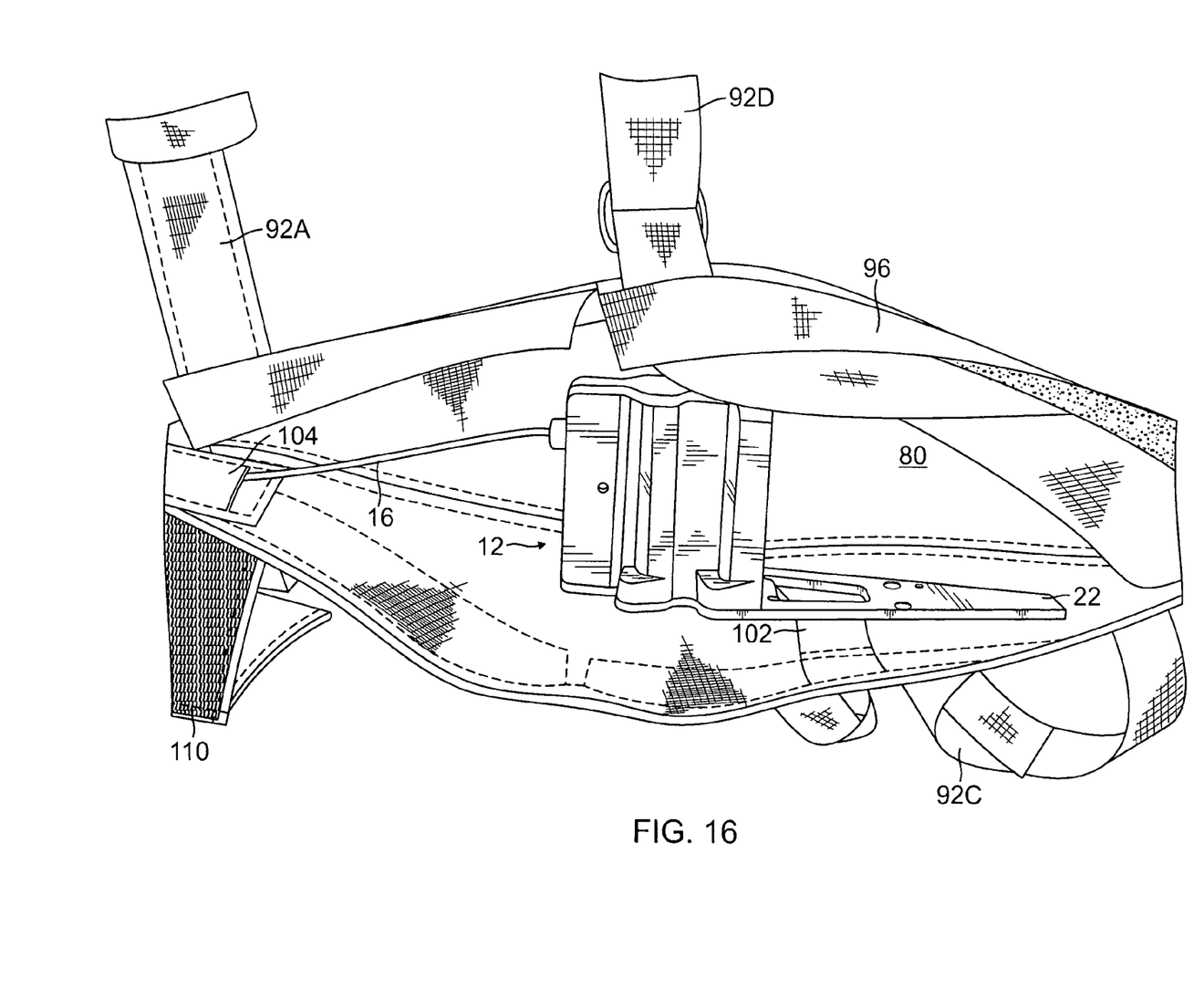
FIG. 16 is a bottom view of the pouch shown in FIG. 14 showing the triggering device shown in FIG. 1 mounted in the pouch with the canister of bear spray removed.

The pouch 80 is shown in FIGS. 14-16. Attached to the pouch 80 are five adjustment buckles 90A, 90B, 90C, 90D, 90E attached to the pouch 80. Five straps 92A, 92B, 92C, 92D, 92E are threadably attached to buckles 90A, 90B, 90C, 90D respectively. The free ends of the straps 92 are detachably connected to the attachment loops 88 provided on the bag 86. The buckles 90 are used to tighten the straps 92 for snugly securing the pouch 80 to the bag 86.

Figure 13:
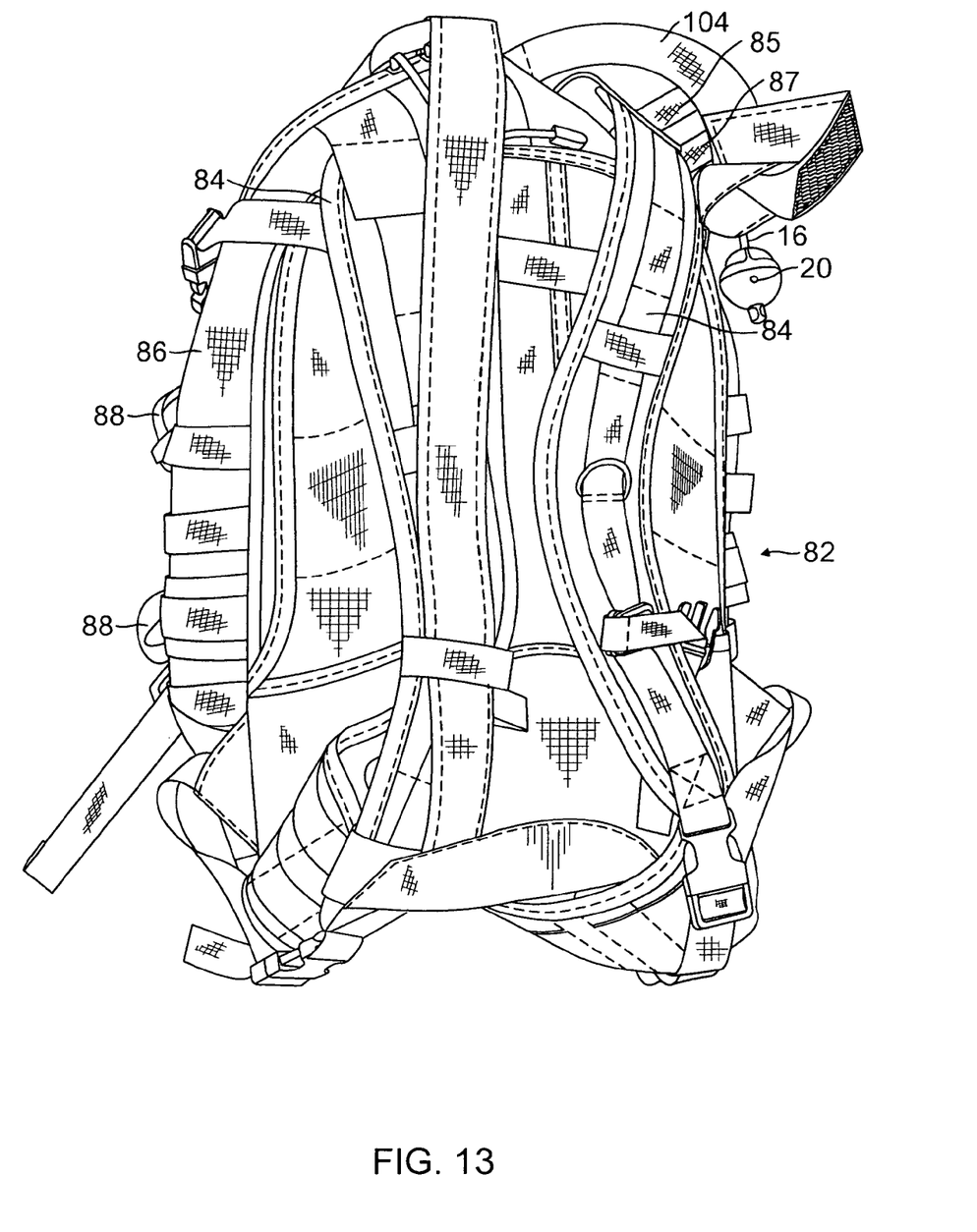
FIG. 13 is a perspective view of the front of the backpack shown in FIG. 12 showing a pull ball mounted to a cable for triggering the bear spray canister.

The reverse side of the pouch 80 includes a slit extending the length of the pouch, the edges of the slit are joined together with hook and loop fastening devices 96 and 98. The holder 12 is mounted within the pouch 80 with a grommet 100 (shown in FIG. 14) extending through the hole 94 and the opening 25 of the shell 13. As described above, when canister 14 is inserted in the holder 12, the nozzle of the canister 14 is aligned with the opening 94. Further, a clip 56 is used to clip the bracket 22 on a strap 102 attached to the pouch 80 as shown in FIG. 16. The cable 16 may be encased in a fabric enclosure 104 and is connected to the pull ball 20 as shown in FIG. 14. The cable 16 is threaded to the front of the backpack 82 with the pull ball 20 secured to a front face of a shoulder strap 84 with hook and loop straps 85 and 87 as shown in FIG. 13 for easy access. A pull ball cover 106 includes a pull tab 108 and a hook and loop fastener 110 for attachment to an associated hook and loop fastener 112 provided on the fabric sleeve 104. When the pull ball is to be used, the pull tab 108 is pulled downwardly exposing the pull ball 20 which can then be grasped by a user to activate canister 14.

While the fundamental novel features of the invention have been shown and described, it should be understood that various substitutions, modifications, and variations may be made by those skilled in the arts, without departing from the spirit or scope of the invention. Accordingly, all such modifications or variations are included in the scope of the invention as defined by the following claims:

I claim:

1. A bear repellant device comprising in combination:
   a backpack having shoulder straps, a bag and attachment loops for attaching equipment to the bag;
   a pouch mounted to the attachment loops and having an opening facing outwardly and rearwardly of the backpack;
   a bear spray canister containing bear spray under pressure and further having a nozzle for projecting bear spray outwardly in a concentrated direction and a trigger which when depressed allows the bear spray to be released through the nozzle;
   a holder mounted in an interior of the pouch for holding the bear spray canister;
   the holder having an opening aligned with the nozzle of the bear spray canister and the opening of the pouch;
   a trigger cam having a first end and a second end which is rotatably mounted in the holder on an axle intermediate the first end and the second end of the trigger cam;
   a cable connected to the first end for selectively rotating the trigger cam about the axle from a rest position to a position where the first end is lifted upwardly;
   the second end positioned to depress the trigger of the bear spray canister when the first end is lifted upwardly and to disengage the trigger when the first end is in the rest position.

2. The bear repellant device according to claim 1 further including a resilient means for biasing the first end of the trigger cam toward the rest position.

3. A bear repellant device according to claim 1 wherein a free end of the cable is connected to a pull ball positioned on a front face of the shoulder strap.

4. Bear repellant device comprising in combination:
   a backpack having shoulder straps and a bag with a rear panel having an opening facing outwardly and rearwardly of the backpack;
   a bear spray canister containing bear spray under pressure and further having a nozzle for projecting bear spray outwardly in a concentrated direction and a trigger which when depressed allows the bear spray to be released from the nozzle;
   a holder mounted in an interior of the bag for holding the bear spray canister;

the holder having an opening aligned with the nozzle of the bear spray canister and the opening of the rear panel;

a trigger cam having a first end and a second end which is rotatably mounted in the holder on an axle intermediate the first end and the second end of the trigger cam;

a cable connected to the first end for selectively rotating the trigger cam about the axle from a rest position to a position where the first end is lifted upwardly;

the second end positioned to depress the trigger of the bear spray canister when the first end is lifted upwardly and to disengage the trigger when the first end is in the rest position.

5. The bear repellant device according to claim 4 further including a resilient means for biasing the first end of the trigger cam toward the rest position.

6. A bear repellant device according to claim 4 wherein a free end of the cable is connected to a pull ball positioned on a front face of the shoulder strap.

\* \* \* \* \*